(12) United States Patent
Harris et al.

(10) Patent No.: US 8,759,260 B2
(45) Date of Patent: Jun. 24, 2014

(54) WELLBORE FLUID ADDITIVES AND METHODS OF PRODUCING THE SAME

(75) Inventors: Jeffery R Harris, Tulsa, OK (US); Marshall D Bishop, Bartlesville, OK (US); Jeffery C Gee, Kingwood, TX (US); Carleton E Stouffer, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 230 days.

(21) Appl. No.: 12/791,965

(22) Filed: Jun. 2, 2010

(65) Prior Publication Data

US 2011/0136702 A1     Jun. 9, 2011

Related U.S. Application Data

(60) Provisional application No. 61/183,281, filed on Jun. 2, 2009.

(51) Int. Cl.
*C09K 8/24* (2006.01)
*C08G 63/08* (2006.01)

(52) U.S. Cl.
USPC .......................................... 507/117; 528/354

(58) Field of Classification Search
CPC .................................. C09K 8/24; C08G 63/08
See application file for complete search history.

(56) References Cited

U.S. PATENT DOCUMENTS

| 4,317,893 A * | 3/1982 | Chen et al. ................. 525/327.5 |
| 2007/0093609 A1 | 4/2007 | Guzmann et al. |
| 2007/0265172 A1 | 11/2007 | Patel et al. |

FOREIGN PATENT DOCUMENTS

| EP | 1916293 | 4/2008 |
| WO | WO 2008001048 A1 | 1/2008 |
| WO | WO 2008001049 A1 | 1/2008 |

OTHER PUBLICATIONS

MSDS sheet, Dimethyl formamide, 2002.*
International Patent Application No. PCT/US2010/037001 Search Report, dated Sep. 23, 2010.
Schmidt, Modification of Poly(octadecene-alt-maleic anhydride) Films by Reaction with Functional Amines, Journal of Applied Polymer Science, vol. 87, 1255-1266 (2003).

* cited by examiner

*Primary Examiner* — Randy Gulakowski
*Assistant Examiner* — Jeffrey Washville
(74) *Attorney, Agent, or Firm* — Conley Rose, P.C.; Rodney B. Carroll; Monte Rhodes

(57) ABSTRACT

Disclosed herein is a polymer useful in a method of forming a wellbore fluid additive. This polymer comprises a polyethylene backbone comprising pendant aminoalkylsulfonic acid amides which comprise a carbonyl directly attached to a backbone carbon, and an amide formed via the amine group from the aminoalkylsulfonic acid. Methods of preparing these polymers by addition of the aminoalkylsulfonic acid to a polymeric anhydride are disclosed. Methods related to oil extraction using the wellbore fluid with the additive are also disclosed.

38 Claims, No Drawings

WELLBORE FLUID ADDITIVES AND METHODS OF PRODUCING THE SAME

CROSS REFERENCE TO RELATED APPLICATIONS

This Application claims the benefit of the Provisional Patent Application having U.S. Ser. No. 61/183,281 filed on Jun. 2, 2009, which hereby is incorporated by reference in its entirety.

BACKGROUND OF THE INVENTION

1. Technical Field

The present disclosure relates to the production of wellbore fluids, such as a process for making a polymeric additive for a wellbore fluid.

2. Background

The present invention relates to a low fluid loss aqueous-based wellbore fluid, for example, a drilling fluid, completion fluid, workover fluid or packer fluid. Conventionally, the drilling of a well into the earth by rotary drilling techniques involves the circulation of a drilling fluid from the surface of the earth down a drill string having a drill bit on the lower end thereof, and through ports provided in the drill bit to the well bottom and thence back to the surface through the annulus formed about the drill string. The drilling fluid serves to cool the drill bit, to transport drill cuttings to the surface, and to stabilize the wellbore.

A problem often encountered in the drilling of a well is the loss of unacceptably large amounts of drilling fluid into subterranean formations penetrated by the well. This problem is often referred to generally as "lost circulation", and the formations into which the drilling fluid is lost are often referred to as "lost circulation zones" or "thief zones". Various causes may be responsible for the lost circulation encountered in the drilling of a well. For example, a formation penetrated by the well may exhibit unusually high permeability or may contain fractures or crevices therein; In addition, a formation may simply not be sufficiently competent to support the pressure applied by the drilling fluid and may break down under this pressure and allow the drilling fluid to flow thereinto. An additional problem associated with drilling through a high permeability formation using a drill bit attached to the lower end of a drill string is that occasionally the drill string becomes stuck and cannot be raised, lowered or rotated. There are numerous causes for this problem, one of the most common being differential sticking. Differential sticking usually occurs when drilling through a permeable formation where the borehole pressure is greater than the formation pressure and when the drill pipe remains at rest against the wall of the borehole for enough time to allow a filter cake comprised of drilling fluid solids to build up around the pipe. The pressure exerted by the drilling fluid then holds the pipe against the filter cake. A reduction in fluid loss from a drilling fluid would reduce the thickness of the filter cake, thus reducing the incidence of differential sticking. Damage (productivity loss) is caused by the invasion of fluids into producing formations associated with the loss of filtrate from drilling fluids and from other types of wellbore fluids such as completion fluids, workover fluids and packer fluids. It would therefore be desirable to reduce the fluid loss from a wellbore fluid into a subterranean formation, in particular, the fluid loss from a drilling fluid into a subterranean formation.

Wellbore fluid compositions, in particular drilling fluid compositions are known to be flowable systems that are generally thickened to a limited extent. Wellbore fluids can be assigned to one of the three following classes: wellbore fluids based on oil which as a rule are used in the form of so-called invert emulsion fluids, and represent preparations of the water-in-oil emulsion type in which the aqueous phase is distributed as a heterogeneous fine dispersion in the continuous oil phase; purely aqueous based wellbore fluids; and aqueous based wellbore fluids of the oil-in-water emulsion type in which the oil phase is distributed as a heterogeneous fine dispersion in a continuous aqueous phase. A disadvantage of wellbore fluids based on oil is that the oil tends to coat the drill cuttings which creates an environmental problem, especially in offshore drilling operations, when the drill cuttings are discarded. To avoid serious pollution, the oil must be cleaned from the cuttings before they can be dumped. It is difficult and expensive to reduce the oil contamination to currently permitted levels, but even these small amounts of residual oil are ecologically undesirable, and there is pressure to replace oil based wellbore fluids with aqueous based ones. However, the technical properties and attributes of aqueous based fluids are significantly different from those of oil based fluids, and the challenges of developing aqueous based fluids are considerable. The present invention relates to improved aqueous based systems, that is, systems having a continuous aqueous phase, i.e. either purely aqueous based fluids, or oil-in-water emulsions.

Wellbore fluids often contain polymers performing various functions. Polymers are commonly added in order to modify the various properties of the fluid, for example, to increase the viscosity of the fluid. For example, WO 2005/105949 discloses a drilling fluid composition comprising a non-aqueous base fluid, a blend of one or more copolymers, and polyethylene. The combined use of the polyethylene and a copolymer leads to improved flow properties and gel strengths. The technology is only applicable to non-aqueous based fluids.

SUMMARY OF THE INVENTION

In an aspect, there is provided a method of forming a wellbore fluid additive, the method comprising reacting an optionally substituted $C_{2-4}$ aminoalkylsulfonic acid with a polymer comprising repeat units of Formula I and Formula II:

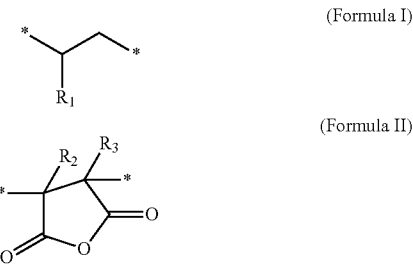

wherein $R_1$ is optionally substituted $C_{10-28}$ alkyl; and $R_2$ and $R_3$ are independently hydrogen, optionally substituted $C_{1-12}$ alkyl, optionally substituted $C_{6-10}$ aryl, optionally substituted $C_{6-10}$ heteroaryl, halo, OH, SH, $C_{0-12}$ amino, $C_{1-12}$ alkoxy, $C_{1-12}$ alkyl sulfide, or $C_{1-12}$ acyloxy; wherein the step of reacting occurs in a mixture of solvents comprising a dipolar aprotic solvent and a protic solvent.

In an aspect, there is provided a method of forming a wellbore fluid additive, the method comprising: reacting an optionally substituted $C_{2-4}$ aminoalkylsulfonic acid with a polymer comprising the repeat units of Formula I and Formula II as described above; wherein the aminoalkylsulfonic acid is present in a first solvent and the polymer is present in a second solvent, and wherein the aminoalkylsulfonic acid is immiscible in the second solvent and the polymer is immiscible in the first solvent.

In some embodiments, wellbore fluid composition may comprise a polymer comprising repeat units of Formula I and Formula III:

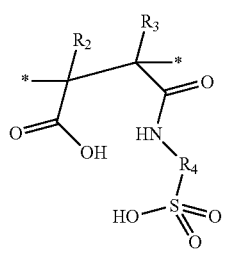

(Formula III)

wherein $R_1$, $R_2$ and $R_3$ are described above; $R_4$ is optionally substituted $C_{2-4}$ alkyl, and wherein the sum of the mass of all —NH—$R_4$—SO$_3$H portions of the polymer is in a range of about 10% to about 30% of the mass of the polymer.

In some embodiments, a wellbore fluid composition comprises a polymer comprising repeat unit A and repeat unit B; wherein repeat unit A is represented by Formula I as described above; and repeat unit B is represented by Formula IV:

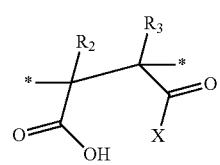

(Formula IV)

wherein $R_2$, $R_3$, and $R_4$ are described above; each X is independently OH or —NH—$R_4$—SO$_3$H; wherein X is —NH—$R_4$—SO$_3$H in about 30% to about 100% of the repeat unit B groups; wherein repeat unit A and repeat unit B have a molar ratio in the range of about 0.5:1 to about 2:1; and the polymer has a molecular weight in the range about 2,000 Daltons to about 500,000 Daltons.

Some embodiments relate to a method of extracting oil comprising drilling earth to form a hole while causing contact, or after causing contact, between any wellbore fluid composition described herein and at least a portion of the earth; and removing oil from the hole.

Some embodiments relate to a method of drilling earth for the purpose of removing oil comprising drilling earth to form a hole while causing contact, or after causing contact, between any wellbore fluid composition described herein and at least a portion of the earth.

Some embodiments relate to a method of reducing lost circulation of drilling fluid during drilling for the purpose of extracting oil comprising causing contact between any wellbore fluid composition of described herein with at least a portion of earth which is to be drilled or is being drilled for the purpose of removing oil.

DETAILED DESCRIPTION OF EMBODIMENTS

Definitions

Reference to a "compound" or "polymer" is intended to include any salt of the compound or polymer. For example, reference to a $C_{2-4}$ aminoalkylsulfonic acid is intended to include salts of the aminoalkylsulfonic acid, including salts of the sulfonic acid group, salts of the amino group, zwitterionic forms comprising salts of both the sulfonic acid group and the amino group, etc.

Unless otherwise indicated, when a structural feature such as alkyl or aryl is referred to as being "optionally substituted," it is intended to mean that the feature may have no substituents or may have one or more substituents. A feature that is "substituted" has one or more substituents. The term "substituent" has the ordinary meaning known to one of ordinary skill in the art. In some embodiments, the substituent is a halogen, or has from 1-10 carbon atoms, or has a molecular weight of less than about 200. In some embodiments, the substituent has from 1-10 carbon atoms and from 0-5 heteroatoms independently selected from: N, O, S, F, Cl, Br, I, and combinations thereof. Examples of substituents include, but are not limited to, alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxyl, protected hydroxyl, alkoxyl, aryloxy, acyl, ester, mercapto, alkylthio, arylthio, cyano, halogen, carbonyl, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfonyl, sulfonyl, haloalkyl, haloalkoxyl, trihalomethanesulfonyl, trihalomethanesulfonamido, and amino, including mono- and di-substituted amino groups, and the protected derivatives thereof. A parent group such as alkyl having at least two or three hydrogen atoms on a carbon atom may have substituents such as =O, =S, =N, N, etc. For example, —CH$_2$CH$_3$ might have an =O substituent, such as in —C(=O)CH$_3$ or an ≡N substituent, such as in —CH$_2$C≡N.

Unless otherwise indicated, in phrases such as "optionally substituted $C_{1-12}$ alkyl" or "optionally substituted $C_{6-10}$ aryl," expressions such as "$C_{1-12}$ alkyl" and "$C_{6-10}$ aryl are used to indicate the number of carbon atoms in the parent group and do not limit the substituents. For example, an "optionally substituted $C_{6-10}$ aryl" would encompass, inter alia, a moiety such as naphthyl with one or more alkyl substituents. Similarly, "optionally substituted $C_{1-12}$ alkyl" would include a moiety such as dodecyl with one or more alkoxy substituents. For substituted alkyl, the number of carbon atoms in a parent alkyl group is the number of contiguous carbon atoms having only single bonds.

The term "alkyl" and its derivatives whenever used in this specification and claims refers to a hydrocarbon moiety having no double or triple bonds. Alkyl may be linear, branched, cyclic, or a combination thereof. Examples of alkyl include but are not limited to: methyl, ethyl, propyl isomers (such as n-propyl, isopropyl, etc.), cyclopropyl, butyl isomers (such as n-butyl, t-butyl, etc.), cyclobutyl isomers (such as cyclobutyl or methylcyclopropyl), pentyl isomers, cyclopentyl isomers (such as cyclopentyl, methylcyclobutyl, ethylcyclopropyl, etc), hexyl isomers, cyclohexyl isomers, and the like. In some embodiments, linear alkyl is —(CH$_2$)$_q$H or —(CH$_2$)$_q$—, where q is 1-28.

The term "amino" and its derivatives whenever used in this specification and claims refers to a hydrocarbon moiety wherein one or more CH groups of the hydrocarbon are replaced with N, or a C of the hydrocarbon is replaced with N$^+$. For example, it can include —NH$_2$ with no carbon atoms (such as where the CH of methyl is replaced with N), primary amines, where the nitrogen is directly bonded to one carbon atom and two hydrogen atoms; secondary amines, where the nitrogen atom is directly bonded to two carbon atoms and one hydrogen atom; tertiary amines, where the nitrogen is bonded to three carbon atoms; or quaternary ammonium salts, where the nitrogen has a positive charge and is bonded to four atoms independently selected from carbon and hydrogen. Amines can be linear, branched, cyclic, or a combination thereof. In some embodiments, the amine is a $C_{0\text{-}12}N_{1\text{-}3}$ amine, meaning that it has 0-12 carbon atoms and 1, 2, or 3 nitrogen atoms in any combination provided there are no N—N bonds.

The term "aminoalkylsulfonic acid" and its derivatives whenever used in this specification and claims refers to a compound comprising an alkyl which is directly attached to an amino moiety and a sulfonic acid (—SO$_3$H) moiety. For an expression such as "optionally substituted $C_{2\text{-}4}$ aminoalkylsulfonic acid," the expression "$C_{2\text{-}4}$" refers to the total number of carbon atoms in the alkyl or directly attached to the nitrogen of the amino group. Carbon atoms in substituents such as alkoxy are not counted as part of "$C_{2\text{-}4}$."

The term "aryl" and its derivatives whenever used in this specification and claims refers to an aromatic ring or ring system. Non-limiting examples of aryl groups are phenyl, naphthyl, etc.

The term "heteroaryl" an aromatic ring or ring system having one or more atoms in an aromatic ring selected from nitrogen, oxygen, or sulfur. Examples include pyridinyl, pyridazinyl, triazinyl, pyridinyl, pyrimidinyl, pyrazinyl, thienyl, furyl, imidazolyl, oxazolyl, thiazolyl, benzoimidazolyl, indolyl, benzooxazolyl, etc.

The term "halo" and its derivatives whenever used in this specification and claims refers to a halogen such as fluorine, chlorine, bromine, iodine, etc.

The term "alkoxy" and its derivatives whenever used in this specification and claims refers to —O-alkyl. Examples include, but are not limited to, —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, etc. Alkoxy comprising one or more rings is also contemplated within the meaning of "alkoxy."

The term "alkyl sulfide" and its derivatives whenever used in this specification and claims refers to —S-alkyl. Examples include, but are not limited to, —SCH$_3$, —SC$_2$H$_5$, —SC$_3$H$_7$, —SC$_4$H$_9$, —SC$_5$H$_{11}$, —SC$_6$H$_{13}$, —SC$_7$H$_{15}$, etc. Alkyl sulfide comprising one or more rings is also contemplated within the meaning of "alkyl sulfide."

The term "acyloxy" and its derivatives whenever used in this specification and claims refers to

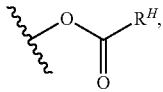

wherein $R^H$ is an optionally substituted hydrocarbon group or "hydrocarbyl." Examples of acyloxy include benzoyloxy, formyloxy, acetyloxy, propionoyloxy, etc.

The term "dipolar aprotic solvent" and its derivatives whenever used in this specification and claims refers a solvent having at least one dipole moment and which lacks acidic protons.

The term "protic solvent" and its derivatives whenever used in this specification and claims refers a solvent having an acidic hydrogen such as on an amine or a hydroxyl moiety.

The term "immiscible" and its derivatives whenever used in this specification and claims refers to a property of a substance, wherein the substance forms a discrete phase as a result of an attempt to mix the substance with the solvent with which the substance is immiscible.

The term "equivalent" and its derivatives whenever used in this specification and claims to refer to an acid/base, is intended to mean the number of moles of basic or acidic functional groups present. For example, a base such as Ca(OH)$_2$ which may react twice with an acid, contains 2 equivalents per 1 mole of Ca(OH)$_2$.

The term "earth" and its derivatives whenever used in this specification and claims refers to any material on or in the surface of the Earth that might be drilled for the purpose of obtaining fossil oil.

Description of Embodiments

In some broad embodiments, the wellbore fluid additives are the reaction product of an optionally substituted $C_{2\text{-}4}$ aminoalkylsulfonic acid and a reacting polymer. In some embodiments, the optionally substituted $C_{2\text{-}4}$ aminoalkylsulfonic acid is represented by Formula V:

NH$_2$—R$_4$—SO$_3$H         (Formula V)

With respect to Formula V, R$_4$ is optionally substituted $C_{2\text{-}4}$ alkyl, such as, but not limited to, optionally substituted: —(CH$_2$)$_2$—, —(CH$_2$)$_3$—, —(CH$_2$)$_4$—, etc. Optionally substituted non-linear alkyl such as —CH$_2$CH(CH$_3$)—, -cyclopropyl-, etc is also contemplated. In some embodiments, the aminoalkylsulfonic acid is optionally substituted taurine.

The reacting polymer comprises repeat units of Formula I and Formula II. With respect to Formula I, each R$_1$ of the polymer is independently optionally substituted $C_{10\text{-}28}$ alkyl, $C_{12\text{-}20}$ alkyl, or alternatively, $C_{14\text{-}18}$ linear alkyl (e.g. —(CH$_2$)$_{13}$CH$_3$, —(CH$_2$)$_{14}$CH$_3$, —(CH$_2$)$_{15}$CH$_3$, —(CH$_2$)$_{16}$CH$_3$, —(CH$_2$)$_{17}$CH$_3$, etc). In some embodiments, the repeat units of Formula I may generally be provided by an alpha olefin monomers wherein the two carbon atoms in the backbone of the polymer are provided by the two double bonded carbons, and the carbons in the pendant R$_1$ group are provided by the alkyl portion of the olefin. For example, $C_{12\text{-}30}$ alpha olefins may provide R$_1$ of $C_{10\text{-}28}$ alkyl, $C_{14\text{-}22}$ alpha olefins may provide R$_1$ of $C_{12\text{-}20}$ alkyl, etc. In some embodiments, the R$_1$ groups provide hydrophobicity to the polymer.

With respect to Formula II, each R$_2$ and R$_3$ may be independently hydrogen; optionally substituted $C_{1\text{-}12}$ alkyl such as optionally substituted methyl, optionally substituted ethyl, optionally substituted propyl isomers, optionally substituted cyclopropyl isomers, optionally substituted butyl isomers, optionally substituted cyclobutyl isomers, optionally substituted pentyl isomers, optionally substituted cyclopentyl isomers, optionally substituted hexyl isomers, optionally substituted cyclohexyl isomers, cyclic $C_{1\text{-}6}$ alkyl, etc.; optionally substituted $C_{6\text{-}10}$ aryl such as optionally substituted phenyl, optionally substituted naphthyl, etc; optionally substituted $C_{6\text{-}10}$ heteroaryl such as optionally substituted pyridinyl, optionally substituted thienyl, optionally substituted furyl, etc; halo, such as F, Cl, Br, I, etc.; OH; SH; $C_{0\text{-}12}$N amino, such as NH$_2$, CH$_5$N, C$_2$H$_7$N, C$_3$H$_9$N, C$_4$H$_{11}$N, C$_5$H$_{13}$N, C$_6$H$_{15}$N, C$_7$H$_{17}$N, C$_8$H$_{19}$N, etc; $C_{1\text{-}12}$ alkoxy such as —OCH$_3$, —OC$_2$H$_5$, —OC$_3$H$_7$, —OC$_4$H$_9$, etc; $C_{1\text{-}12}$ alkyl sulfide such as —SCH$_3$, —SC$_2$H$_5$, —SC$_3$H$_7$, etc; or $C_{1\text{-}12}$ acyloxy such as benzoyloxy, acetyloxy, propionoyloxy, etc. In some embodiments, each R$_2$ and R$_3$ is independently hydrogen, CH$_3$, C$_2$H$_5$, C$_3$H$_7$, or C$_4$H$_9$. In some embodiments, substantially all R$_2$ and R$_3$ are hydrogen. In some embodiments, repeat units of Formula II may be provided by monomers such as unsaturated anhydrides including maleic anhydride having an R$_2$ group on one unsaturated carbon and an R$_3$ group on the adjacent unsaturated carbon, wherein the two adjacent unsaturated carbons in the monomer provide the two carbon atoms of the polymer backbone in repeat units of Formula II. In some embodiments, the repeat units of Formula II provide hydrophilicity to the polymer.

In some embodiments, the total mass of the repeat units of Formula I represent about 15% to about 70%, or alternatively, about 30% to about 70%, of the mass of the reacting polymer. In some embodiments, the molar ratio of the repeat units of Formula I to the repeat units of Formula II is from about 0.5:1, about 0.6:1, about 0.7:1 about 0.8:1, about 0.9:1, or alternatively, about 1:1, to about 1.3:1, about 1.5:1, about 1.3:1. about 1.4:1, about 1.7:1, or alternatively about 2:1. The repeat units of Formula I and Formula II may be in any order. They may be randomly arranged, form discrete blocks, alternate, or be any combination thereof. The polymer may or may not be crosslinked. The polymer may also incorporate other groups other than those described by Formula I and Formula II. In some embodiments, repeat units of Formula I and Formula II comprise at least 70%, 80%, at least 90% or alternatively, at least 99% of the carbon atoms of the polymer backbone. In some embodiments, less than 20%, 15%, 10%, or alternatively less than 5%, of the repeat units of the product polymer comprise —$CH_2$—$CH_2$O—.

Some embodiments of the reacting polymers disclosed herein are commercially available. Examples of such commercially available polymers include, but are not limited to: poly(maleic anhydride-alt-tetradecene) as supplied by Aldrich (average molecular weight 9,000); poly(maleic anhydride-alt-octadecene); sold by Chevron Phillips Chemical Company as "PA-18 Polyanhydride Resin" (average molecular weights of about 20,000 (LV version) and 50,000 (HV version)); poly(maleic anhydride-alt-α-olefin, C24-C28) average molecular weight 6,400; and poly(maleic anhydride-alt-ethylene) supplied by Vertellus (average molcecular weight of about 400,000).

Although the reactions between the aminoalkylsulfonic acid and the polymer may produce a complex mixture of products, in some embodiments, the reaction product comprises at least some repeat units which represent an amide reaction product between the amine group of the aminoalkylsulfonic acid and the anhydride group of the repeat unit represented by Formula II. The product of the amide forming reaction may be a repeat unit which comprises two adjacent carbon atoms which form the backbone of the repeat unit, where one of these two carbon atoms has an aminoalkylsulfonic acid amide pendant group and the other carbon atom has a carboxylic acid pendent group. Generally, the groups of both the reactants and the products may have a number of different forms depending upon the pH conditions. For example, the sulfonic acid groups and carboxylic acid groups may be protonated and have a charge of 0, or deprotonated and have a charge of −1; and the amine groups may be protonated and have a charge of +1, or deprotonated and have a charge of 0. In some embodiments, substantially all —$SO_3H$ groups in the reacting polymer or the reaction product polymer which is used in the wellbore composition are present as —$SO_3^-$. In some embodiments, at least about 70%, about 75%, about 80%, about 85%, about 90%, about 95%, or alternatively, at least about 99% of the —$CO_2H$ groups in the polymer used in the wellbore composition are present as —$CO_2^-$ when the polymer is added to the wellbore fluid composition.

In some embodiments, the reaction products comprise a polymer comprising repeat units of Formula I and Formula III. In some embodiments, the reaction products comprise a polymer comprising repeat units of Formula I and Formula IV. In some embodiments, the reaction products comprise a polymer comprising repeat units of Formula I, Formula III, and Formula IV. With respect to repeat units of Formula I in the polymer product, $R_1$ may be any moiety described for $R_1$ with respect to repeat units of Formula I in the reacting polymer above. With respect to Formula III or Formula IV, $R_2$ and $R_3$ may independently be any moiety described for $R_2$ and $R_3$ with respect to repeat units of Formula II in the reacting polymer above.

With respect to Formulas III and IV, $R_4$ may be any moiety described for $R_4$ of the aminoalkylsulfonic acid of Formula V above.

The composition of the polymer product may depend to some extent on the composition of the reacting polymer. For example, the repeat unit of Formula I generally does not react with the aminoalkylsulfonic acid. Thus, the relative molar ratio of the repeat units of Formula I to the repeat units of Formula II may affect the composition of the reaction product polymer used in the wellbore fluid additive. For example, the molar ratio of the repeat unit of Formula I to the repeat unit of Formula II in the reacting polymer may be substantially similar to the molar ratio of the repeat unit of Formula I to the repeat unit of Formula III or Formula IV, or the molar ratio of repeat unit A to repeat unit B. Thus, in some embodiments, the molar ratio any of the following pairs of repeat units: 1) Formula I: Formula III, 2) Formula I: Formula IV, or 3) repeat unit A: repeat unit B, may be substantially identical to the ratios described for Formula I and Formula II above. In some embodiments, the polymer used in the wellbore fluid consists essentially of repeat unit A and repeat unit B and any necessary hydrogen atoms to terminate a polymer chain.

In addition to the total number of repeat units of Formula II, the relative contribution of the amide in the reaction product polymer may depend upon the amount of aminoalkylsulfonic acid added relative to the number of repeat units of Formula II in the reacting polymer. For example, if the repeat unit of Formula II is in excess, a greater amount of aminoalkylsulfonic acid added relative to the repeat units of Formula II may result in a greater contribution of the amide in the reaction product polymer. In some embodiments, the relative amount of the repeat unit of Formula II in the reacting polymer and the relative amount of the aminoalkylsulfonic acid are chosen to provide a reaction product polymer wherein the sum of the mass of the amide portion, calculated in neutral form (or without counterions) is in the range of from about 10%, about 12%, about 14%, about 16%, about 18%, or alternatively, about 20%, to about 24%, to about 27%, about 30%, about 34%, about 36%; about 38%, or alternatively, about 40%. For example, in some embodiments comprising a polymer comprising repeat units of Formula I and Formula III, the sum of the mass of all —NH—$R_4$—$SO_3H$ portions of the polymer is in the range of from about 10%, about 12%, about 14%, about 16%, about 18%, or alternatively about 20%, to about 22%, about 24%, about 26%, about 28%, or alternatively, about 30% of the mass of the polymer.

In embodiments where the anhydride repeat unit is in excess with respect to the aminoalkylsulfonic acid, the polymer may comprise repeat units which may have two carboxylic acid groups, or a carboxylic acid group and an amide group. For example, the polymer may comprise repeat units represented by Formula IV wherein each X is independently OH or —NH—$R_4$—$SO_3H$. In some of these embodiments, X is —NH—$R_4$—$SO_3H$ in from about 30%, about 35%, about 40%, about 45% about 50%, about 55% about 60%, or alternatively, about 65%, to about 70%, about 75%, about 80%, about 85%, about 90%, about 95%, or alternatively, about 100% of the repeat units represented by Formula IV.

In some embodiments, the polymer used in a wellbore fluid additive comprises a repeat unit of Formula VI:

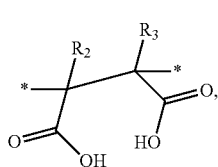

(Formula VI)

In some embodiments, the polymer used in a wellbore fluid additive consists essentially of repeat units of Formula VI, Formula VII, and Formula I, wherein the repeat unit of Formula VI comprises about 10% to about 20%, about 13% to about 17%, or alternatively, about 15% of the repeat units in the polymer; the repeat unit of Formula VII comprises about 20% to about 60%, about 30% to about 40%, or alternatively, about 35% of the repeat units of the polymer; and Formula I comprises about 40% to about 60%, about 45% to about 55%, or alternatively, about 50% of the repeat units of the polymer such that the sum of the components is selected so that the total is 100%.

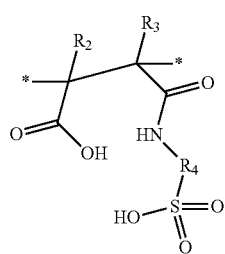

(Formula VII)

The molecular weight of the polymer used in the wellbore fluid may be varied by varying the molecular weight of the polymer reacting with the aminoalkylsulfonic acid. In some embodiments, the viscosity of the wellbore fluid may be related to the molecular weight of the polymer. For example, higher molecular weight polymers may provide a more viscous fluid. In some embodiments, the reacting polymer or the wellbore fluid polymer has an average molecular weight in the range of from about 2,000 Daltons, about 10,000 Daltons, about 15,000 Daltons, about 20,000 Daltons, or alternatively, about 30,000 Daltons, to about 70,000 Daltons, about 100,000 Daltons, about 300,000 Daltons, about 400,000 Daltons, or alternatively, to about 500,000 Daltons. In some embodiments, the polymer is designed by tuning molecular weight and other properties to obtain a relatively low viscosity. In some embodiments, the viscosity of a 5% by weight solution of the polymer in fresh water at a temperature of 20° C. and at a pH between 10 and 12 may be no greater than 50 cP, or alternatively no greater than 25 cP, as measured using a Farm 35 rheometer at 300 rpm rotor speed.

The reactions described above may be carried out under a variety of conditions. Some embodiments provide any reaction disclosed herein in a mixture of solvents. For example, in some embodiments, the reaction is carried out a solvent combination of a first and a second solvent. In some embodiments, the first solvent is protic and the second solvent is a dipolar aprotic solvent. In some embodiments, the first solvent is water and the second solvent is dimethylformamide, dimethylacetamide, dimethylsulfoxide or n-methylpyrrolidinone In one embodiment, the first solvent is water and the second solvent is dimethylformamide. In some embodiments, the first solvent may be from about 1%, about 2%, about 3%, about 4%, about 5%, or alternatively, about 6% to about 7%, about 8%, about 9%, about 10%, about 11%, or alternatively, about 12% by weight of the total solvent and the second solvent may be from about 99%, about 98%, about 97%, about 96%, about 95%, about 94% to about 93%, about 92%, about 91%, about 89%, or alternatively, about 88% by weight of the total solvent. In other embodiments, the reaction is carried out in a mixture of a dipolar aprotic solvent and water, wherein the ratio of the dipolar aprotic solvent to water is about 100:1 to about 5:1. In other embodiments, the reaction is carried out in a mixture of a dipolar aprotic solvent and water, wherein the ratio of the dipolar aprotic solvent to water is about 100:1 to about 8:1. In other embodiments, the reaction is carried out in a mixture of a dipolar aprotic solvent and water, wherein the ratio of the dipolar aprotic solvent to water is about 50:1 to about 8:1. In other embodiments, the reaction is carried out in a mixture of a dipolar aprotic solvent and water, wherein the ratio of the dipolar aprotic solvent to water is about 25:1 to about 12:1. For example, the reaction may be carried out in dimethylforamide and water.

The reactions disclosed herein may be carried out in a single pot process, i.e. where everything is added substantially simultaneously. However, in some instances this may result in a final product which is a gelatinous precipitated mass which may be difficult to deal with on an industrial scale.

Alternatively, the reaction may be carried out by separately preparing one or both of the polymer and the aminoalkylsulfonic acid before combining the two. For example, in some embodiments, the aminoalkylsulfonic acid and the polymer are separately prepared for reaction. In some embodiments, the aminoalkylsulfonic acid may be dissolved or dispersed in a first liquid, and the polymer may be dissolved or dispersed in a separate second liquid. These two liquids may have the same or different compositions. For example, in some embodiments, the aminoalkylsulfonic acid is separately dissolved or dispersed in a mixture of the first and second solvents described above. In some of these embodiments the aminoalkylsulfonic acid may be dissolved in a mixture of a first solvent, which is a protic solvent such as water, and a second solvent which is a dipolar aprotic solvent such as dimethylformamide, dimethylacetamide, dimethylsulfoxide or n-methylpyrrolidinone. In some of these embodiments, the polymer is separately dissolved or dispersed in the second solvent (e.g. one of the dipolar aprotic solvents above).

In one embodiment, the aminoalkylsulfonic acid is dissolved in a combination of water and a dipolar aprotic solvent and the polymer is dissolved in a dipolar aprotic solvent. The polymer dissolved in the dipolar aprotic solvent is then slowly added to the aminoakylsulfonic acid. Without being limiting, this method may provide several advantages. First, it may allow generation of a water soluble/water dispersible product polymer from two previously incompatible components such as the reacting polymer and an aminoalkylsulfonic acid. Second, the dipolar aprotic/aqueous solvent mixtures may permit adequate reactivity to take place between the aminoalkylsulfonic acid and the reacting polymer despite the fact that the aminoalkylsulfonic acid may be insoluble in the dipolar aprotic solvent, and the reacting polymer may be insoluble in water. Third, the mixed dipolar aprotic/water mixtures may provide for quick reactivity followed by precipitation of a fine particulate final product, thereby affording efficient recovery.

Additionally, the heat of reaction may be controlled through the gradual and controlled addition of polymer to the aminoalkylsulfonic acid.

In embodiments where the aminoalkylsulfonic acid and the polymer are separately prepared, one or both of these may be preheated in preparation for the reaction. For example, in some embodiments, one or both of the aminoalkylsulfonic acid and the polymer may be heated to about 60° C., about 65° C. about 70° C., or alternatively, about 75° C., to about 80° C., about 85° C., about 90° C., about 95° C., or alternatively, about 100° C., or alternatively, to about 75° C. to about 85° C.

In some embodiments the separate preparation may comprise the addition of a base such as sodium hydroxide to the aminoalkylsulfonic acid. In some embodiments, this may neutralize at least part of the aminoalkylsulfonic acid before reaction with the polymer. In some embodiments, this may be helpful in keeping the nitrogen atom of the amine group deprotonated so that it may more readily attack one of the carbonyl groups of the anhydride of the repeat unit of Formula II. In some embodiments, the amount of base added is during the sample preparation is at least about 0.8 equivalents, or alternatively, about 1 equivalent, up to about 1.5 equivalents, about 2 equivalents, or alternatively, about 2.5 equivalents, for every mole of the aminoalkylsulfonic acid present. This addition of a base to the aminoalkylsulfonic acid may be exothermic, so that in embodiments wherein the aminoalkylsulfonic acid is heated, some or all of the heating may occur by the exotherm of the reaction.

In embodiments where the polymer and the aminoalkylsulfonic acid are separately prepared, the two are combined in some manner after the separate preparation steps are accomplished. In some embodiments, the polymer is gradually added to the entire amount of aminoalkylsulfonic acid, wherein the aminoalkylsulfonic acid may be dissolved in a mixture of the first and second solvents described above. For example, small amounts of a liquid containing the polymer may be added (e.g. dropwise addition) to a reaction vessel containing substantially all of the aminoalkylsulfonic acid and any solvents over a period of time, such as from about 5, about 10, about 15, or alternatively, about 18 to about 20, about 60, about 90, or alternatively, about 200 minutes, until all of the polymer has been added. If this method is employed, all of the aminoalkylsulfonic acid may be in the reaction flask initially. Thus, the portion added to the aminoalkylsulfonic acid in the early stages of the addition may have greater aminoalkylsulfonic acid amide substitution along the backbone. In the latter stages of the polymer addition, less aminoalkylsulfonic acid may be added to the polymer. Thus, in some embodiments, a portion of the polymer molecules will have a greater degree of aminoalkylsulfonic acid amide pendant group substitution, and a portion of the polymer will have lesser degree of aminoalkylsulfonic acid amide pendant group substitution.

In other embodiments, the aminoalkylsulfonic acid is slowly added to the entire amount of polymer. For example, small amounts of a liquid containing the aminoalkylsulfonic acid may be added (e.g. dropwise addition) to a reaction vessel containing all of the polymer and any solvents over a period of time, such as from about 5, about 10, about 15, or alternatively, about 18 to about 20, about 60, about 90, or alternatively, about 200 minutes, until all of the aminoalkylsulfonic acid has been added.

In some embodiments, a stream of the polymer is fed into a stream of aminoalkylsulfonic acid each other to maintain constant aminoalkylsulfonic acid concentration in the presence of polymer.

In some embodiments, additional caustic is added during the addition of the polymer to the aminoalkylsulfonic acid, or vise versa. In embodiments where the aminoalkylsulfonic acid and the reacting polymer are added simultaneously, caustic or base may also be added, at least about 0.8 equivalents, or alternatively, about 1 equivalent, up to about 1.5 equivalents, about 2 equivalents, or alternatively, about 2.5 equivalents, for every mole of the aminoalkylsulfonic acid present.

After all of the aminoalkylsulfonic acid has been combined with all of the polymer, the mixture may be held with or without stirring for from about 0.2 hours, about 0.5 hours, about 1 hour, about 2 hours, or alternatively about 4, to about 6 hours, 10 hours, 15 hours, or alternatively, about 20 hours. In some embodiments, the temperature of the mixture is from about 60° C. to about 200° C., or about 80° C. to about 120° C.

After the holding period, additional caustic or base may be added to the reaction mixture. In some embodiments, this may convert at least part of the —$CO_2H$ groups formed during the reaction to —$CO_2^-$. In some embodiments, about 0.05 equivalents, 0.1 equivalents, or alternatively, about 0.2 equivalents, to about 0.3 equivalents, about 0.5 equivalents, or alternatively, about 1 equivalent, of caustic or base are added to the reaction mixture for each mole of aminoalkylsulfonic acid.

Thus in some embodiments, the total amount of caustic or base is at least about 2 equivalents, about 2.5 equivalents, or alternatively, about 2.7 equivalents to about 3 equivalents, about 3.5 equivalents, about 4 equivalents, or about 5 equivalents of caustic or base, for every mole of the repeat unit of Formula II in the reacting polymer.

In some embodiments, the reaction product provided by the reaction, either with or without adding additional caustic may comprise polymer particles which are precipitated in the mixed solvent. In some embodiments, the reaction product polymer may be captured and dried. In some embodiments, the at least 90% by weight of the dried reaction product polymer has a particle size of less than 1000 microns, or alternatively, 500 microns. In some embodiments, particles within the above size ranges are obtained without application of any external mechanical grinding activity.

The reaction product polymers may be used as wellbore fluid additives. These additives may provide useful properties to the fluid, such as preventing drilling fluid loss, increasing or decreasing viscosity, improved flow properties, improved gel strength. In some embodiments, the polymer contains sufficient hydrophilic units to provide a polymer solubility of at least 2% in water at 20° C. Hydrophilicity may generally be increased by increasing the number of, or the hydrophilicity of the groups on, repeat units of at least one of: Formula III, Formula IV, Formula V, Formula VI, and Formula VII.

The polymer may be an amphiphilic block copolymer having at least one polymeric block comprising a series of repeat units of Formula I and at least one polymeric block comprising a series of repeat units selected from at least one of: Formula III, Formula IV, Formula V, Formula VI, and Formula VII. In some embodiments, the block copolymer may be a di-, tri-, or multi-block copolymer. In some embodiments, the block copolymer is an AB block copolymer, an ABA block copolymer or an ABC block copolymer. Where the polymer is an ABA block copolymer the A blocks may be hydrophobic and the B block hydrophilic or the A blocks may be hydrophilic and the B block hydrophobic.

In some embodiments, the number of repeat units of Formula I incorporated into the reaction product polymer may be chosen so that the polymer is not overly hydrophobic. In some embodiments, the hydrophile-lipophile balance (HLB) value of the polymer is at least about 7, at least about 8, or alternatively at least about 10 (HLB is a well-known scale that characterizes emulsifiers in terms of their tendency to form oil in water or water in oil emulsions, see Griffin W C: "Classification of Surface-Active Agents by HLB," Journal of the Society of Cosmetic Chemists 1(1949): 311). Although there is no set or fixed upper limit to the HLB value, in some embodiments the polymer may have an HLB value of 40 or less. The concentration of the reaction product polymer in the aqueous wellbore fluid may be adjusted as desired to suit the needs of the person of ordinary skill in the art. In some embodiments, the concentration of the polymer may be about 0.1% to about 20% by weight based on the total weight of the aqueous phase or, in the case of an oil-in-water emulsion, the combined aqueous and oil phases in the absence of any weighting agents or other constituents of the fluid. However, in some embodiments a relatively low content of polymer may be used for economic and rheological reasons. In some embodiments where the fluid is an oil-in-water emulsion, the content of polymer may be about 0.1 to about 8 percent by weight, or alternatively about 0.5 to about 6 percent by weight. In some embodiments where the fluid is purely water based, the content of polymer may be from about 0.1 to about 10 percent by weight, or alternatively about 0.5 to about 8 percent by weight.

In some embodiments, wellbore fluid has a continuous aqueous phase. Thus, it may be either a purely aqueous based fluid, or an oil-in-water emulsion, i.e. an emulsion in which water is the continuous phase, and any oil present is present as a dispersion of oil droplets in the water. The reaction product polymers may have emulsifier and surfactant properties since they comprise both hydrophilic and hydrophobic units. In embodiments comprising an oil-in-water emulsion, the polymer may tend to act as an emulsifier, and may stabilize the droplets of oil in the continuous aqueous phase. In some embodiments, minor amounts of at least one conventional emulsifier for an oil-in-water emulsion may additionally be present. However, in some embodiments, the reaction product polymer is the only emulsifier or surfactant present in the wellbore fluid, whether the fluid is an emulsion or an entirely aqueous system. Suitable conventional emulsifiers would be well known to the person skilled in the art.

In embodiments comprising a water-based wellbore fluid, such as when the fluid is a purely water based fluid, the polymer may tend to form micelles. The critical micelle concentration (CMC) is the minimum concentration at which the polymer molecules begin to aggregate to form micelles.

In some embodiments, the wellbore fluid is a drilling fluid, completion fluid, workover fluid or packer fluid. In some embodiments, incorporation of the reaction product polymer leads to reduced fluid loss when using the wellbore fluid, and the wellbore fluid may be characterized as being an ultra-low fluid loss wellbore fluid. Fluid loss may be determined using a high temperature high pressure (HTHP) fluid loss test, according to the specifications of the American Petroleum Institute (API) as detailed in "Recommended Practice Standard Procedure for Field Testing Water-Based Drilling Fluids", API Recommended Practice 13B-I Second Edition, September 1997, Section 5.3.1 to 5.3.2. The test employs a pressurized cell fitted with a standard hardened filter paper as a filtration medium. The filtration area is 7.1 square inches (0.0045 m$^2$) or may be smaller. If smaller, the result reported is corrected to a filter area of 7.1 square inches. For instance the filtrate volume using a 3.55 square inches (0.0023 m$^2$) filter area is doubled to provide the corrected result. Generally, the filtration behavior of the wellbore fluid in the HTHP test is determined with a pressure differential across the filter paper of 500 psi (3.45×10$^6$ Pa). Suitably, the temperature at which the HTHP fluid loss test is carried out may be varied to correspond to the downhole temperature. Generally, the test temperature is in the range of 50 to 150° C. A filter cake is allowed to build up on the filter paper for 30 minutes and the volume of filtrate collected during this 30 minute period is then recorded.

In some embodiments, the reaction product polymer is incorporated in the wellbore in an amount effective to achieve an HTHP fluid loss value, when the test is performed at a temperature of 250° F. (121° C.) and a differential pressure of 500 psi, of less than about 7 ml/30 minutes, less than about 5 ml/30 minutes, or alternatively less than about 2 ml/30 minutes. In some embodiments, an advantage of the ultra-low fluid loss wellbore fluid is that the reduced invasion of the fluid into the formation may decrease formation damage.

In embodiments where the wellbore fluid takes the form of an oil-in-water emulsion, the discontinuous oil phase of the fluid may for example be a crude oil, a refined petroleum fraction, a mineral oil, a synthetic hydrocarbon, or any non-hydrocarbon oil that is capable of forming a stable emulsion with the continuous aqueous phase. In some embodiments, such a non-hydrocarbon oil is biodegradable and therefore may not be associated with ecotoxic problems. In some embodiments, the non-hydrocarbon oil has a solubility in water at room temperature of less than about 2% by weight, less than about 1.0% by weight, or alternatively, less than about 0.5% by weight.

In some embodiments comprising an emulsion, the oil phase, is for example, dispersed in the continuous aqueous phase in an amount of from about 1 to about 65% by volume, about 2.5 to about 40% by volume, or alternatively about 10 to about 35% by volume based on the total volume of the aqueous and oil phases. In some embodiments the oil phase is distributed in the aqueous phase in the form of finely divided droplets. In some embodiments, the droplets of oil phase have an average diameter of less than about 40 microns, about 0.5 to about 20 microns, or alternatively about 0.5 to about 10 microns.

In some embodiments, the discontinuous oil phase may be a synthetic hydrocarbon or a non-hydrocarbon oil selected from polyalkylene glycols, esters, acetals, ethers and alcohols.

Suitable polyalkylene glycols may include polypropylene glycols (PPG), polybutylene glycols, polytetrahydrofurans, and polyalkylene glycols produced by the polycondensation of 1,3 propanediol or by the polymerization of trimethylene oxide. In some embodiments, the molecular weight of the polyalkylene glycol may be sufficiently high that the polyalkylene glycol has a solubility in water at room temperature of less than 2% by weight. The polyalkylene glycol may also be a copolymer of at least two alkylene oxides. In some embodiments, ethylene oxide may be employed as a comonomer provided that the mole percent of units derived from ethylene oxide is limited such that the solubility of the copolymer in water at room temperature is less than 2% by weight. The person skilled in the art would be able to readily select polyalkylene glycols that exhibit the desired low water solubility. Suitable esters may include esters of unsaturated fatty acids and saturated fatty acids as disclosed in EP 0374671 A and EP 0374672 respectively; esters of neo-acids as described in WO 93/23491; oleophilic carbonic acid diesters having a solubility of at most 1% by weight in water (as disclosed in U.S. Pat. No. 5,461,028); triglyceride ester oils such as rapeseed oil (see U.S. Pat. No. 4,631,136 and WO 95/26386). Suitable acetals are described in WO 93/16145.

Suitable synthetic hydrocarbons may include polyalphaolefins (see, for example, EP 0325466A, EP 0449257A, WO 94/16030 and WO 95/09215); isomerized linear olefins (see EP 0627481 A, U.S. Pat. Nos. 5,627,143, 5,432,152 and WO 95/21225); n-paraffins, in particular n-alkanes (see, for example, U.S. Pat. Nos. 4,508,628 and 5,846,913); linear alkyl benzenes and alkylated cycloalkyl fluids (see GB 2,258, 258 and GB 2,287,049 respectively). Suitable ethers may include those described in EP 0391251 A (ether-based fluids) and U.S.Pat. No. 5,990,050 (partially water-soluble glycol ethers). Suitable alcohols may include oleophilic alcohol-based fluids as disclosed in EP 0391252A.

In some embodiments, the wellbore fluid may be an entirely water-based system, in which case the carrier fluid comprises a solution of the polymer in water wherein insubstantial amounts of oil, or no oil, is present.

The water in the wellbore fluid may be fresh water, brackish water, seawater, or a synthetic brine containing one or more salts. In some embodiments, the salt should be compatible with the polymer, for example, it should not form an insoluble precipitate with the polymer. Suitable salts may include alkali metal halides, alkali metal carbonates, alkali metal sulfates, alkali metal formates, alkali metal phosphates, alkali metal silicates, alkaline earth metal halides, and zinc halides. The salt may be present in the aqueous solution at concentration up to saturation. It is known that the CMC (critical micelle concentration) of an aqueous solution may be adjusted by altering the salinity of the aqueous solution. Thus, a higher salinity of the aqueous solution may lower the CMC. Accordingly, in some embodiments, a salt, particularly a salt of a monovalent cation, may be added to the aqueous solution to lower the CMC and hence increase the number of micelles, vesicles or lamellar structures. In some embodiments, the salt in a brine is present at a concentration in the range about 0.5 to about 25% by weight, for example, in the range about 3 to about 15% by weight, based on the total weight of the brine.

In some embodiments, the specific gravity of the wellbore fluid is in the range of about 0.9 to about 2.5, or alternatively, about 1.0 to about 2.0. In some embodiments, the wellbore fluid may additionally comprise at least one additional fluid loss control agent. As would be well known to the person skilled in the art, the fluid loss from a wellbore fluid, especially a drilling fluid, may be reduced to some extent by incorporating conventional fluid loss control agents in the fluid. Suitable known fluid loss control agents that may be incorporated in the ultra-low fluid loss wellbore fluid include organic polymers of natural and/or synthetic origin. Suitable polymers include starch or chemically modified starches; cellulose derivatives such as carboxymethylcellulose and polyanionic cellulose (PAC); guar gum and xanthan gum; homopolymers and copolymers of monomers selected from: acrylamide, acrylamido-2-methyl propane sulfonic acid (AMPS), styrene sulfonic acid, N-vinyl acetamide, N-vinyl pyrrolidone, and N,N-dimethylacrylamide wherein the copolymer has a number average molecular weight of from about 100,000 to about 1,000,000; asphalts (for example, sulfonated asphalts); gilsonite; lignite (humic acid) and its derivatives; lignin and its derivatives such as lignin sulfonates or condensed polymeric lignin sulfonates; and combinations thereof. Any of these polymers that contain acidic functional groups are preferably employed in the neutralized form e.g. as sodium or potassium salts. As an alternative to, or in addition to, employing such additives, the fluid loss when using a drilling fluid may be reduced by adding finely dispersed particles such as clays (for example, illite, kaolinite, bentonite, hectorite or sepiolite) to the fluid. While not being bound by any theory, it is believed that a filter cake comprised of fluid loss additives and/or finely divided clay particles will build up on the wellbore wall and/or will bridge fractures present in the wellbore wall. These fractures may be naturally occurring or may be induced during the drilling of the wellbore. It is believed that the filter cake will additionally comprise fluid drilling of the wellbore. It is believed that the filter cake will additionally comprise fluid droplets and other solids that are present in the drilling fluid such as drill cuttings.

In some embodiments, a bridging particulate material is added to an ultra-low fluid loss wellbore fluid in order to assist in the formation of a filter cake and to assist in bridging the fractures. In some embodiments, the bridging particulate material comprises at least one substantially crush resistant particulate solid. Some exemplary bridging particulate materials for adding to the fluid include graphite, calcium carbonate, celluloses, micas, proppant materials such as sands or ceramic particles and combinations thereof. These materials are very inert and are environmentally acceptable. In some embodiments, the bridging particulate material is sized so as not to enter the pores of any permeable rock through which the wellbore is being drilled. Typically, but not necessarily, the bridging material has an average particle diameter in the range of about 25 to about 2000 microns, about 50 to about 1500 microns, or alternatively, about 250 to about 1000 microns. The bridging material may comprise substantially spherical particles. However, it is also envisaged that the bridging material may comprise elongate particles, for example, fibers. Preferably, the bridging material has a broad (polydisperse) particle size distribution.

In some embodiments, finely-dispersed additives for increasing the fluid density may also be incorporated. Suitable additives for increasing the fluid density include barium sulfate (barite), calcium carbonate (calcite), the mixed carbonate of calcium and magnesium (dolomite), hematite and mixtures thereof.

Optionally, the fluid of the present invention may comprise thinners (dispersants) for viscosity regulation. So-called thinners can be of organic or inorganic nature; examples of organic thinners are tannins and/or quebracho extract. Further examples are lignin and lignin derivatives, particularly lignosulfonates. Other useful dispersants include synthetic water-soluble polyanionic polymers such as sodium polyacrylate having a number average molecular weight, $M_n$, in the range about 1,000 to about 100,000, or alternatively about 5,000 to about 50,000. Polyphosphate compounds are examples of inorganic thinners. In some embodiments, thinners may have a dual function acting both as a thinner and a fluid loss additive. Thus, the thinner (dispersant) may act by dispersing the solids contained in a drilling fluid which assists in the formation of a low permeability filter cake thereby reducing fluid loss. The thinner may also act directly to reduce fluid loss by sealing the wellbore wall.

In some embodiments, the plastic viscosity of the wellbore fluid is in the range of about 1 to about 100 mPa·s. In some embodiments, the yield point is between about 2 and about 50 Pa.

Optionally, the wellbore fluid composition may comprise additives which inhibit undesired water-exchange with, for example, clays. Any of the known additives for use in water-based drilling fluids may be employed. Suitable additives include halides, formates, sulphates, phosphates, carbonates and silicates of the alkali metals, or the halides of the alkaline earth metals and zinc, with particular importance given to potassium salts, optionally in combination with lime. Reference is made, for example, to the appropriate publications in "Petroleum Engineer International", September 1987, 32-40 and "World Oil", November 1983, 93-97. In some embodiments, other so-called shale inhibitors may be added to the drilling fluid to stabilize clays and shales including polyacrylamides and polyamines.

In some embodiments, the quantity of auxiliary substances and additives used in each case lie within the usual boundaries for a drilling fluid. In some embodiments, an advantage associated with the present ultra-low fluid is that the low fluid loss may strengthen the wellbore wall by the solids contained therein bridging cracks and fissures thereby increasing the hoop stress. In some embodiments, a further advantage of the ultra-low fluid loss wellbore fluid is that the reduction in the fluid loss reduces the filter cake thickness thereby reducing the incidence of differential sticking. According to a further embodiment there is provided a method of carrying out a wellbore operation using a circulating water-based wellbore fluid, the method comprising circulating in the wellbore a water-based wellbore fluid disclosed herein. Wellbore operations include drilling, completion and workover.

In some embodiments, the wellbore fluid may also be employed in the method of reducing formation breakdown during the drilling of a wellbore through a formation with a circulating drilling fluid that is described in WO 2005/012687 which is herein incorporated by reference. Thus, in some embodiments, the drilling fluid that is circulating in the wellbore may be selected so as to have a fluid loss value of less than about 2 ml/30 minutes (measured according to the high temperature high pressure API fluid loss test described in WO 2005/012687).

In some embodiments, prior to encountering formation breakdown, a solid particulate material having an average particle diameter of about 25 to about 2000 microns is added to the drilling fluid in a concentration of at least about 0.5 pounds per barrel, at least about 10 pounds per barrel, or alternatively, at least about 15 pounds per barrel. This may allow drilling to be continued through the formation with the pressure in the wellbore maintained at above the initial fracture pressure of the formation.

The following examples are included to demonstrate specific embodiments of the invention. Those of skill in the art should appreciate that the techniques disclosed in the examples represent techniques discovered to function well in the practice of the invention. However, in light of the present disclosure, those of skill in the art will appreciate the changes that can be made in the specific disclosed embodiments while still obtaining similar results that do not depart from the spirit and scope of the invention.

EXAMPLE 1

A laboratory reactor consisting of a 5 liter 3-neck round bottom flask, stir rod and Teflon paddle, 1 liter addition funnel (traced with electrical tape), thermometer, heating mantle, and nitrogen purge mechanism was assembled for the purpose of the above reaction. Upon reactor assembly and purging with nitrogen, Dimethylformamide (600 grams) was charged to the flask followed by Taurine 99% (60.6 grams; 0.47 moles) and 50% Sodium Hydroxide (38.3 grams; 0.47 moles). As an alternative method, solid pellet Sodium Hydroxide may be utilized followed by an equivalent weight of distilled water. Thus, water was incorporated into the mixture at a beginning weight of 2.7% of total mass. If pellet Sodium Hydroxide was used, the exotherm was monitored to prevent the temperature from rising thereby allowing DMF to react with strong base at elevated temperature. Use of 50% Caustic avoided the potential DMF decomposition reaction.

To the pre-heated, nitrogen-purged 1 liter addition funnel was added Dimethylformamide (600 grams) followed by PA-18 Resin (240 grams; 0.68 moles of Maleic Anhydride functionality). This PA-18/DMF mixture was stirred frequently by manual means as the mixture was allowed to heat to 85° C. Simultaneously, the reaction flask containing DMF and Taurine was heated to 85° C. Contents of both reaction flask and addition funnel typically reached 85° C. in approximately 20 minutes.

With both reaction flask and addition funnel at 85° C. and the PA-18 fully dissolved in DMF, the addition of PA-18 solution to the reaction flask was commenced. Addition time averaged 18-20 minutes, hence the addition rate was approximately 42 g/min or 0.09 lb/min. Coinciding with the addition of PA-18 resin solution was the further addition of 50% Sodium Hydroxide (38.3 grams; 0.47 moles) slowly added over the 20 minute PA-18 addition. Upon completion of the addition of the PA-18 solution to the reaction flask at approximately 85° C., the reaction was allowed to heat further to 110° C. where the mixture was held for 4 hours. At the end of the 4 hour hold time, the temperature of the flask contents was allowed to cool to 85° C. Lastly, 50% Sodium Hydroxide (16.4 grams; 0.20 moles) was added to convert any residual carboxylic acid groups to sodium carboxylate salt over a 30 minute timeframe. The reaction contents were then cooled to 25° C. where the mixture was transferred to a sintered glass filter with vacuum assistance. Upon filtering the particulate matter, a cake was collected and further washed and filtered twice with Isopropyl Alcohol. The final filter cake was placed in a baffled Buchi roto-evaporator flask and dried under vacuum and wet heat. Particle size of the resulting Taurine modified polymer are shown in Table 1. Particle size was determined by two differing methods consisting of a sieve screening analysis and a Beckman Coulter Particle Size Analyzer. Both methods revealed 90% of particle mass being less than 50.0 microns in size.

TABLE 1

| Sieve | Microns | Wt. per sieve (g) | Weight % | Cum. Wt. (g) | Cum. Wt. % |
|---|---|---|---|---|---|
| sock | <20 | 0.189 | 0.93% | 0.189 | 0.93% |
| 600 | +20-53 | 6.237 | 30.64% | 6.426 | 31.57% |
| 270 | +53-125 | 3.915 | 19.23% | 10.341 | 50.80% |
| 120 | +125-180 | 1.376 | 6.76% | 11.717 | 57.56% |
| 80 | +180-250 | 1.153 | 5.66% | 12.87 | 63.22% |
| 660 | +250-425 | 2.092 | 10.28% | 14.962 | 73.50% |
| 40 | +425 | 5.395 | 26.50% | 20.357 | 100.00% |
| | Total Wt. | 20.357 | 100.00% | | |

All of the compositions and methods disclosed and claimed herein can be made and executed without undue experimentation in light of the present disclosure. Unless otherwise stated, all % measurements are in terms of weight percent, as opposed to volume percent. While the compositions and methods of this invention have been described in terms of particular embodiments, it will be apparent to those of skill in the art that variations may be applied to the compositions and methods and in the steps or in the sequence of steps of the methods described herein without departing from the concept, spirit and scope of the invention as defined by the appended claims.

What is claimed is:

1. A method of forming a wellbore fluid additive, the method comprising reacting an optionally substituted $C_{2-4}$ aminoalkylsulfonic acid and a polymer comprising the following two types of repeat units:

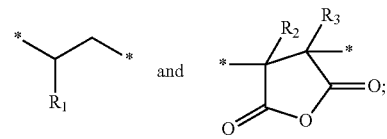

wherein $R_1$ is optionally substituted $C_{10-28}$ alkyl; and
$R_2$ and $R_3$ are independently hydrogen, optionally substituted $C_{1-12}$ alkyl, optionally substituted $C_{6-10}$ aryl, optionally substituted $C_{6-10}$ heteroaryl, halo, OH, SH, $C_{0-12}$ amino, $C_{1-12}$ alkoxy, $C_{1-12}$ alkyl sulfide, or $C_{1-12}$ acyloxy;

wherein the reacting occurs in a mixture of solvents further comprising a dipolar aprotic solvent, and water; wherein at least about 1% by weight of water is added to the dipolar aprotic solvent and wherein the optionally substituted $C_{2-4}$ aminoalkylsulfonic acid is reacted with a base in an amount of 0.8 equivalents to 2.5 equivalents per mole of optionally substituted $C_{2-4}$ aminoalkylsulfonic acid prior to and/or simultaneously with reaction with the polymer.

2. The method of claim 1, wherein the mixture of solvents comprises adding between about 1% by weight of water to less than about 12% by weight of the water to the dipolar aprotic solvent, wherein the solvent mixture comprises about 99% to about 88% by weight of the dipolar aprotic solvent.

3. The method of claim 1, wherein the mixture of solvents further comprises at least one of dimethylformamide, dimethylacetamide, dimethylsulfoxide or n-methylpyrrolidinone.

4. The method of claim 1, wherein reacting takes place in a temperature range of about 60° C. to about 100° C.

5. The method of claim 1, wherein reacting takes place in a temperature range of about 75° C. to about 85° C.

6. The method of claim , further comprising treating a product of the step of reacting with a caustic, in the reaction vessel.

7. The method of claim 1, wherein the step of reacting further comprises dissolving the polymer in at least one of dimethylformamide, dimethylacetamide, dimethylsulfoxide and n-methylpyrrolidinone, and gradually adding the resulting polymer solution to a mixture of aminoalkylsulfonic acid comprising water, base in an amount of 0.8 equivalents to 2.5 equivalents per mole of optionally substituted $C_{2-4}$ aminoalkylsulfonic acid and at least one of dimethylformamide, dimethylacetamide, dimethylsulfoxide and n-methylpyrrolidinone.

8. The method of claim 1, wherein reacting produces a reaction product comprising precipitated polymer particles in the mixture of solvents.

9. The method of claim 8, further comprising capturing the reaction product and drying the polymer, wherein at least 90% by weight of the dried polymer particles has a particle size of less than 500 microns without application of any external mechanical grinding activity.

10. The method of claim 1, wherein the reacting produces a reaction product comprising at least one amide of the aminoalkylsulfonic acid, wherein all amide portions of the polymer have a total mass which is in a range of about 10% to about 40% of the mass of the polymer.

11. A method of forming a wellbore fluid additive, the method comprising:

reacting an optionally substituted $C_{2-4}$ aminoalkylsulfonic acid with a polymer comprising the following two types of repeat units:

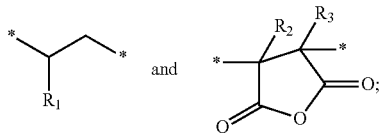

wherein $R_1$ is optionally substituted $C_{10-28}$ alkyl; and
$R_2$ and $R_3$ are independently hydrogen, optionally substituted $C_{1-12}$ alkyl, optionally substituted $C_{6-10}$ aryl, optionally substituted $C_{6-10}$ heteroaryl, halo, OH, SH, $C_{0-12}$ amino, $C_{1-12}$ alkoxy, $C_{1-12}$ alkyl sulfide, or $C_{1-12}$ acyloxy; and wherein the aminoalkylsulfonic acid is present in a first solvent and the polymer is present in a second solvent, and the first solvent comprises water in an amount of at least about 1 wt % based on the combined weight of the first solvent and the second solvent;

wherein a base is reacted with the aminoalkylsulfonic acid prior to and/or simultaneous with the reacting of the aminoalkylsulfonic acid and the polymer; wherein the base is present in an amount of 0.8 equivalents to 2.5 equivalents per mole of aminoalkylsulfonic acid; and wherein the aminoalkylsulfonic acid is immiscible in the second solvent and the polymer is immiscible in the first solvent.

12. The method of claim 11, wherein the reaction of the aminoalkylsulfonic acid and the polymer takes place in a solvent combination of the first and the second solvent.

13. The method of claim 11, further comprising adding water to the first solvent in an amount of equal to or less than about 12% by weight.

14. The method of claim 11, wherein the second solvent is dimethylformamide dimethylacetamide.

15. The method of claim 11, wherein the second solvent further comprises dimethylsulfoxide or n-methylpyrrolidinone.

16. The method of claim 11, wherein reacting the first and second solvents takes place in a temperature range of about 60° C. to about 100° C.

17. The method of claim 11, wherein reacting the first and second solvents takes place in a temperature range of about 75° C. to about 85° C.

18. The method of claim 11, further comprising treating a product of the reacting step with a caustic in the reaction vessel.

19. The method of claim 11, wherein the second solvent is gradually added to the aminoalkylsulfonic acid.

20. The method of claim 11, wherein reacting solvents produces a reaction product comprising precipitated polymer particles in the mixed solvent.

21. The. method of claim 20, further comprising capturing the reaction product polymer and drying the polymer particles, wherein at least 90% by weight of the dried polymer particles has a particle size of less than 500 microns.

22. The method of claim 11, wherein reacting produces a reaction product comprising at least one amide of the aminoalkylsulfonic acid, wherein all amide portions of the polymer have a total weight which is in a range of about 12% to about 27% of the weight of the polymer.

23. A method of forming a wellbore fluid additive, the method comprising reacting an optionally substituted $C_{2-4}$ aminoalkylsulfonic acid and a polymer comprising the following two types of repeat units:

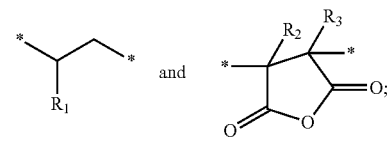

wherein $R_1$ is an optionally substituted $C_{10-28}$ alkyl; and
$R_2$ and $R_3$ are independently hydrogen, optionally substituted $C_{1-12}$ alkyl, optionally substituted $C_{6-10}$ aryl, optionally substituted $C_{6-10}$ heteroaryl, halo, OH, SH, $C_{0-12}$ amino, $C_{1-12}$ alkoxy, $C_{1-12}$ alkyl sulfide, or $C_{1-12}$ acyloxy;

wherein prior to and/or simultaneously with the reacting of the aminoalkylsulfonic acid and the polymer a mixture of water, a base, and a dipolar aprotic solvent is added to the aminoalkylsulfonic acid; and wherein the water is added in an amount of from about 1% to about 12% by weight and the dipolar aprotic solvent is added in an amount of from about 99% to about 88% by weight based on the combined weight of the water and the dipolar aprotic solvent and the base is present is present in an amount of 0.8 equivalents to 2.5 equivalents per mole of optionally substituted $C_{2-4}$ aminoalkylsulfonic acid.

24. The method of claim 23, wherein the dipolar aprotic solvent comprises at least one of dimethylformamide, dimethylacetamide, dimethylsulfoxide or n-methylpyrrolidinone.

25. The method of claim 23, wherein reacting takes place in a temperature range of about 60° C. to about 100° C.

26. The method of claim 23, wherein reacting takes place in a temperature range of about 75° C. to about 85° C.

27. The method of claim 23, further comprising treating a reaction product of the reacting with a caustic.

28. The method of claim 23, wherein reacting produces a reaction product comprising precipitated polymer particles.

29. The method of claim 28, further comprising capturing a reaction product polymer and drying the reaction product polymer particles, wherein at least 90% by weight of the dried polymer particles has a particle size of less than 500 microns without application of any external mechanical grinding activity.

30. The method of claim 23, wherein reacting produces a reaction product comprising at least one amide of the aminoalkylsulfonic acid, wherein all amide portions of the polymer have a total mass which is in a range of about 10% to about 40% of the mass of the polymer.

31. A method of forming wellbore fluid additive, the method Comprising:
forming a first mixture comprising an optionally substituted $C_{2-4}$ aminoalkylsulfonic acid, a first solvent wherein the first solvent is water, and a second solvent;
forming a second mixture comprising a polymer and a third solvent, wherein the second and third solvents are the same or different, and wherein the polymer comprises the following two types of repeat units;

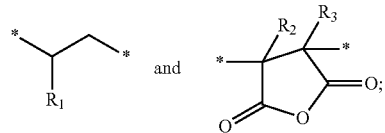

wherein $R_1$ is optionally substituted $C_{10-28}$ alkyl; and
$R_2$ and $R_3$ are independently hydrogen, optionally substituted $C_{1-12}$ alkyl, optionally substituted $C_{6-10}$ aryl, optionally substituted $C_{6-10}$ heteroaryl, halo, OH, SH, $C_{0-12}$ amino, $C_{1-12}$ alkoxy, $C_{1-12}$ alkyl sulfide, or $C_{1-12}$ acyloxy; and gradually adding the second mixture to first mixture, wherein the polymer reacts with the optionally substituted $C_{2-4}$ aminoalkylsulfonic acid wherein a base is added in an amount of 0.8 equivalents to 2.5 equivalents per mole of optionally substituted $C_{2-4}$ aminoalkylsulfonic acid prior to and/or simultaneously with reaction of the polymer with the optionally substituted $C_{2-4}$ aminoalkylsulfonic acid.

32. The method of claim 31, wherein the second solvent comprises at least one of dimethylformamide, dimethylacetamide, dimethylsulfoxide or n-methylpyrrolidinone, and the third solvent comprises at least one of dimethylformamide, dimethylacetamide, dimethylsulfoxide or n-methylpyrrolidinone.

33. The method of claim 31, wherein the second mixture is gradually added to the first mixture in a temperature range of about 60°C. to about 100° C.

34. The method of claim 31, wherein the second mixture is gradually added to the first mixture in as temperature range of about 75° C. to about 85° C.

35. The method of claim 31, further comprising capturing a reaction product polymer and drying the reaction product polymer, wherein at least 90% by weight of the dried reaction product polymer has a particle size of less than 500 microns.

36. The method of claim 1, wherein the polymer has a hydrophile-lipophile balance of at least about 8.

37. The method of claim 1, wherein the repeat units comprise at least 70% of a backbone of the polymer.

38. The method of claim 1, wherein the polymer comprises poly(maleic anhydride-alt-tetradecene, poly(maleic anhydride-alt-octadecene, poly(maleic anhydride-alt-α-oleflin), poly(maleic anhydride-alt-ethylene), or combinations thereof.

* * * * *